June 24, 1958 — L. E. CLINE — 2,839,872
GLASS CANE AND TUBE SEVERING APPARATUS

Filed June 8, 1954 — 5 Sheets-Sheet 1

INVENTOR
LEON E. CLINE
BY *Rule and Hope*
ATTORNEYS

June 24, 1958

L. E. CLINE 2,839,872

GLASS CANE AND TUBE SEVERING APPARATUS

Filed June 8, 1954

5 Sheets-Sheet 2

INVENTOR
LEON E. CLINE
BY
ATTORNEYS

June 24, 1958  L. E. CLINE  2,839,872
GLASS CANE AND TUBE SEVERING APPARATUS
Filed June 8, 1954  5 Sheets-Sheet 5

INVENTOR
LEON E. CLINE
BY
ATTORNEYS

United States Patent Office 2,839,872
Patented June 24, 1958

2,839,872

GLASS CANE AND TUBE SEVERING APPARATUS

Leon E. Cline, Vineland, N. J., assignor to Owens-Illinois Glass Company, a corporation of Ohio Application June 8, 1954, Serial No. 435,118

16 Claims. (Cl. 49—48)

My invention relates to a method and apparatus for severing into individual tubes or canes, glass or like material which is continuously drawn from a pool of molten glass or other supply body and formed into cane or a tube as it is drawn. The stock is severed into uniform lengths after the glass is cooled and hardened. It is old in the art to draw glass cane or tubing in this manner and sever it as it is drawn into uniform lengths, by means of a rotary disk or cutter rotating in a plane perpendicular to the stock and periodically lowered to contact and score the glass, the severing disk also being mounted to travel with the glass during the scoring operation.

The present invention provides an improved construction and method of operation wherein the cutting or scoring disk moves forward with the advancing stock but is not moved toward the glass. The invention provides means for moving the glass cane or tubing laterally into contact with the severing disk. This lateral movement of the glass materially assists in the severing operation by producing a certain amount of strain in the glass at the severing point. Paddles or the like may be used in co-operation with the severing disk to positively insure severing or breaking the tubes when scored by the disk.

The apparatus in the form herein illustrated provides means for continuously drawing the cane or stock horizontally, a severing disk positioned over the glass and mounted at the free end of a horizontally oscillated arm for moving the disk forward with the glass during each severing operation. The tubing or cane as it passes through the severing zone is supported on an underneath support which is lifted by means of a cam to contact the glass with the scoring disk. At the same time the lifting of the glass places it under a strain or stress which facilitates the severance of the glass.

Figure 1:
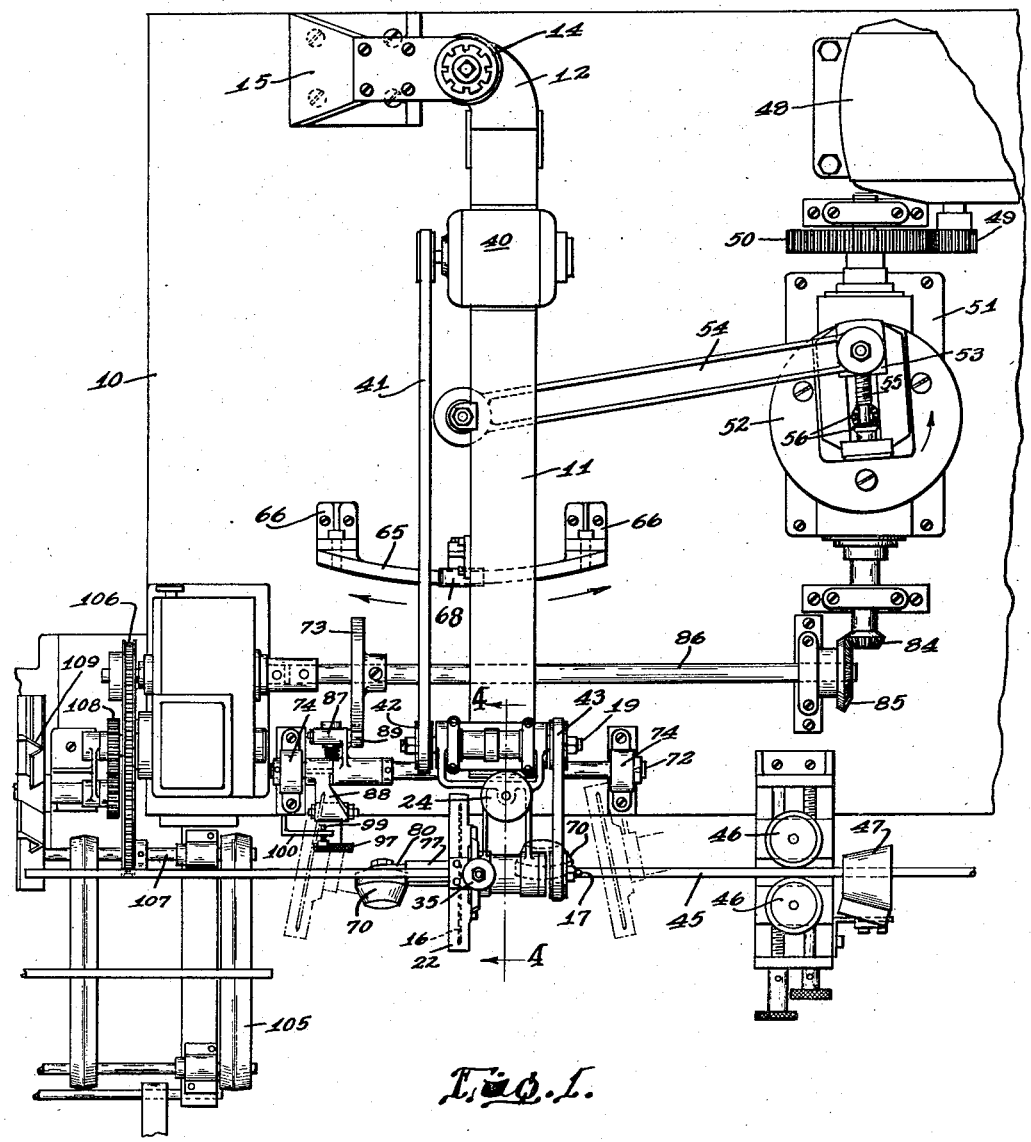
Figure 2:
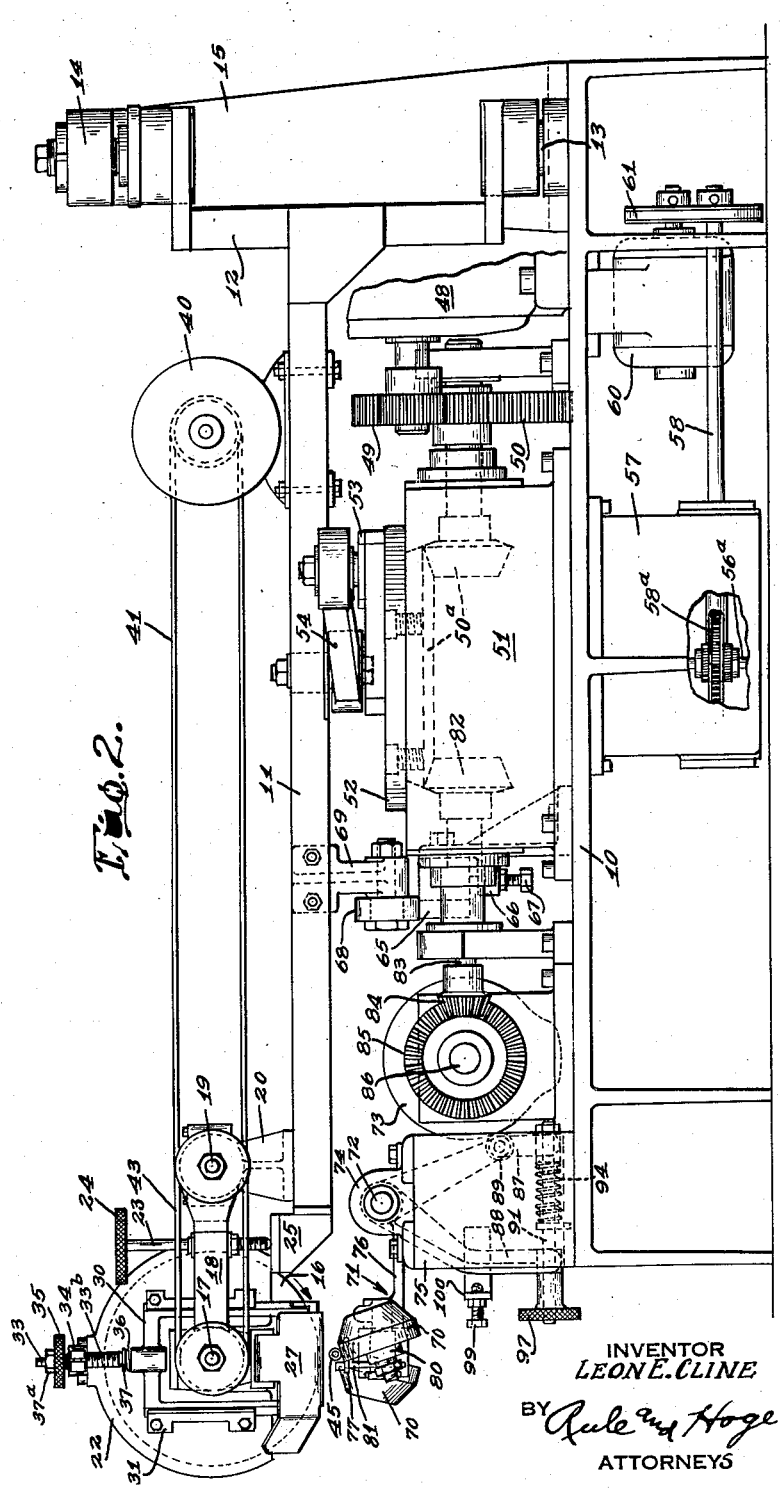
Figure 3:
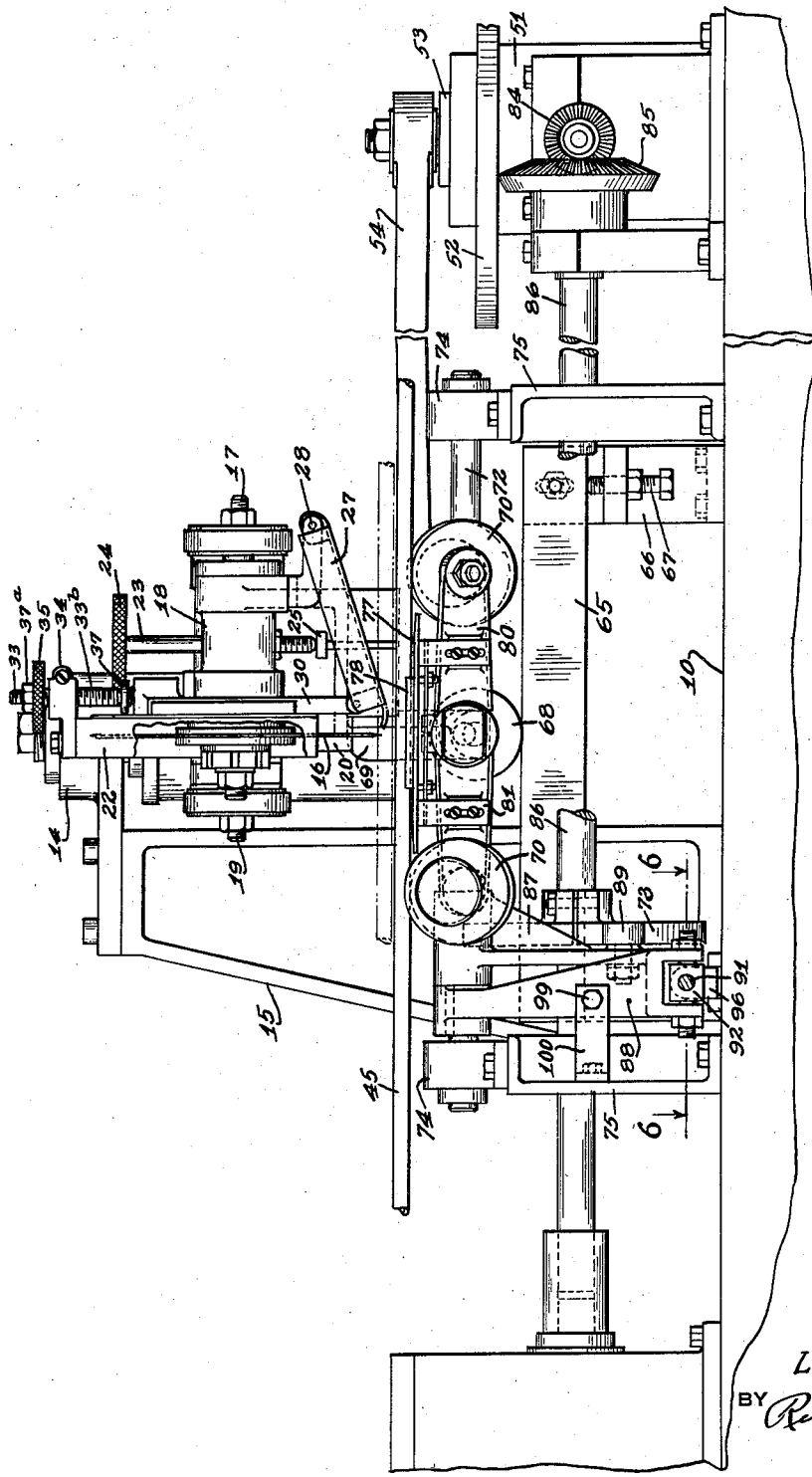
Figure 4:
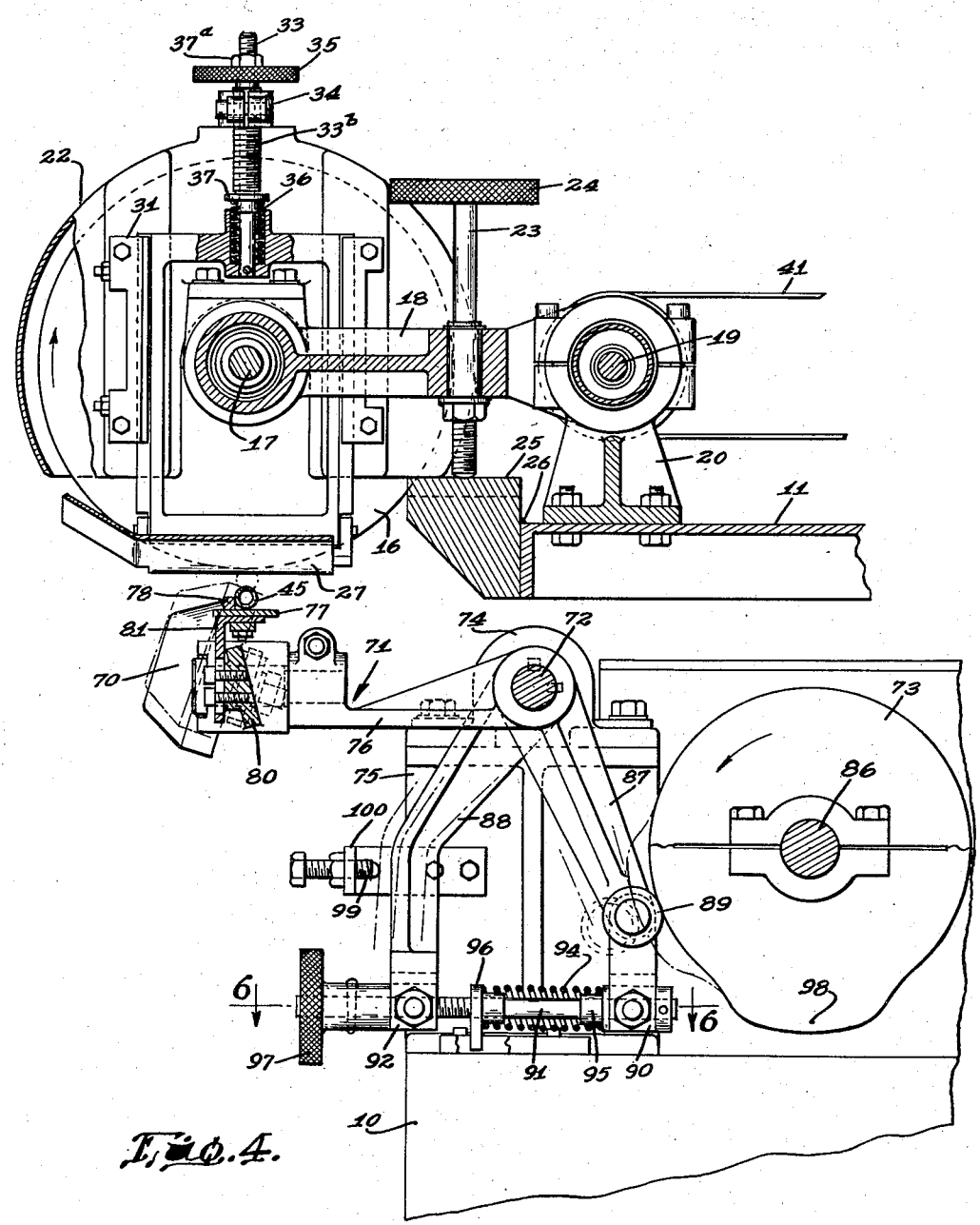
Figure 5:
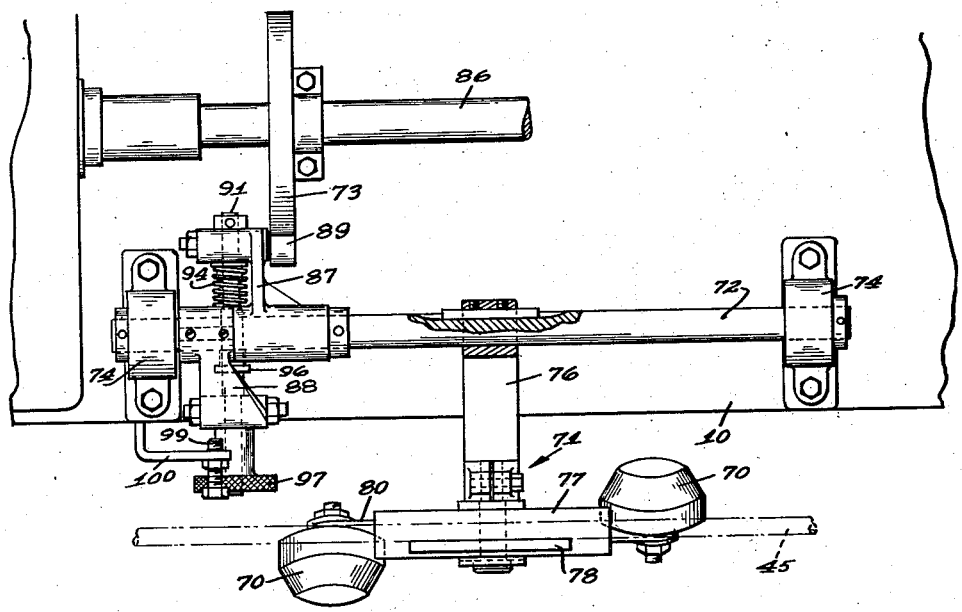
Figure 6:
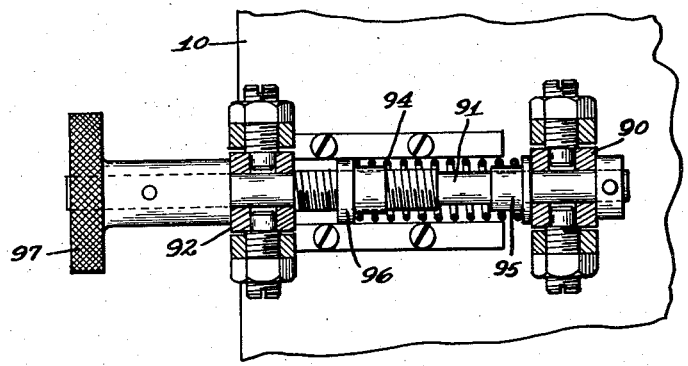

Referring to the accompanying drawings which illustrate a preferred form of apparatus embodying the invention:

Fig. 1 is a plan view of the apparatus;
Fig. 2 is a side elevational view of the same;
Fig. 3 is a front elevation of the apparatus;
Fig. 4 is a part sectional elevation on a larger scale, at the line 4—4 on Fig. 1, illustrating the severing disk and the cam operated means for lifting the glass for the severing operation;
Fig. 5 is a part sectional plan view showing the cam operated means for lifting the glass for the scoring operation; and
Fig. 6 is a section at the lines 6—6 on Figs. 3 and 4.

Referring to Figs. 1, 2 and 3, the apparatus is mounted on a supporting frame or base 10 and includes a horizontal arm 11 pivoted for horizontal oscillation. The arm 11 is attached to a vertical bracket 12 having a lower bearing 13 and upper bearing 14, the latter carried on a standard 15. The glass scoring or severing disk or saw 16 is carried at the forward free end of the arm 11. The disk is mounted on a horizontal shaft 17 journalled in a carrier frame 18 pivoted to swing up and down about a pivot shaft 19 in a standard 20 mounted on the arm 11. This mounting of the disk 16 is for the purpose of permitting up-and-down adjustment thereof, and particularly for adjusting the disk downward as its diameter is reduced by wear. The disk 16 is supported and partly enclosed within a housing 22 (Figs. 2 and 4) carried on the swinging carrier frame 18, which is adjustable up and down by means of an adjusting rod 23. The rod is screw threaded through the arm and adjustable by a handwheel 24. The lower end of the rod rests on a stop plate 25 attached to the arm 11 as by means of a weld 26.

Referring to Fig. 3, a gauge 27 in the form of an inclined sheet metal plate is pivotally connected at 28 to a bracket on the frame 18. The lower or forward end of the gauge is in close proximity to the vertical plane of the scoring disk 16. The forward end of the gauge 27 is pivotally connected to a vertical frame 30 mounted for up-and-down sliding movement in guides 31 on the housing 22. The frame 30 is supported by a vertical shaft 33 which is connected by a pin at its lower end (Fig. 4) to the frame. A sleeve 33$^b$, loose on the shaft, is screw threaded through a split collar 34 attached to the housing. A coil spring 36 is mounted on the rod 33 and may be held under compression by a collar 37 loose on the shaft. An adjusting knob 35 is attached to or formed integral with the sleeve 33$^b$. The upper end portion of the shaft is screw threaded to receive a nut 37$^a$ which serves as a stop to limit the downward movement of the shaft relative to the sleeve 33$^b$. As shown in Fig. 4, the gauge plate 27 extends downward a short distance below the periphery of the cutter disk 16. When the stock 45 is lifted for the cutting or scoring operation, the gauge is lifted thereby and moves the frame 30 upwardly against the force of the spring 36. This upward movement is limited by the stop collar 37, thus determining and limiting the depth of the score or cut. This depth may be adjusted by loosening the clamping collar 34 and rotating the sleeve 33$^b$ for lifting or lowering the rod 33 with the suspended frame 30 and gauge 27. The stop nut 37$^a$ may be adjusted up or down on the shaft thereby raising or lowering the stop position of the shaft and thus adjusting the compression of the spring 36. This adjustment may change the position of the gauge 27 which may thereafter be readjusted by means of the adjusting sleeve 33$^b$ in the manner above pointed out.

The scoring disk 16 is driven by a motor 40 mounted on the arm 11 and having a driving connection with the disk through a belt 41 trained over the motor pulley and a pulley 42 on the shaft 19. A belt 43 is trained over pulleys on the shafts 19 and 17. The stock 45, which may be either in the form of a glass tube or a solid rod, is continuously drawn forward horizontally in the direction of its length by conventional drawing means such as a caterpillar drive (not shown), and passes between supporting and guiding rolls 46 and 47 (Fig. 1) before it reaches the severing station. The oscillating arm 11 is moved forward in timed relation with the movement of the stock 45 and carries the scoring disk 16 forward at the same speed as the glass during its scoring operation.

The means for oscillating the arm 11 comprises an electric motor operating through a speed reduction gear 48, driving a pinion 49 and gear 50. The gear 50 has driving connection, through gearing 50$^a$ (Fig. 2) in a gear box 51, to a disk 52. The disk carries an eccentric bearing block 53 (Fig. 1) slidably mounted on the disk for adjustment radially thereof. The disk has a driving connection with the arm 11 through a link 54. The bearing block 53 is adjustable by means of a screw-threaded rod 55 threaded in the block and connected through miter gears 56 with a vertical adjusting shaft 56$^a$ (Fig. 2) extending downward into a gear box 57.

A shaft 58 connected through gearing 58ª to the shaft 56ª, is driven by an electric motor 60 having a driving connection through a belt 61 to the shaft 58. The motor, which is reversible, is operable through the train of gearing just described for adjusting the bearing 53 and thereby adjusting the amplitude of oscillation of the arm 11 and scoring disk to correspond to the desired length of the tubes or rods which are being severed. The motor 60 is manually controlled by push buttons and is operated only for adjusting the eccentric block 53.

The weight of the arm 11 and parts carried thereby is supported on an arc-shaped track 65. The track is mounted for vertical adjustment on supporting brackets 66 (Fig. 3) bolted to the frame base 10. Adjusting screws 67 are provided, permitting up-and-down adjustment of the scoring disk assembly. A roll 68 (Fig. 2) is mounted on a bracket 69 attached to the underside of the arm 11 and runs on the track 65.

The mechanism and its operation for periodically lifting the rod 45 for the severing operations may be described as follows.

The rod moves forward over a pair of inclined supporting and guiding rollers 70 carried on a supporting frame or carrier 71 attached to a rock shaft 72 which is rocked by a cam 73 as presently described. The rock shaft 72 is journalled in bearings 74 mounted on standards 75 on the machine base 10. The carrier 71 includes a radial arm 76 (Fig. 5) keyed to the rock shaft and a transverse arm or plate 77 at the outer end of the arm 76 and positioned parallel with the rod 45 and directly therebeneath. A rail 78 on the plate 77 serves as a guard to hold the rod 45 in position. The rolls 70 are journalled in arms 80 (Figs. 3 and 4) to which the plate 77 is attached by brackets 81. The brackets and plate 77 are adjustable up and down relative to the rolls 70.

The cam 73 is driven from the motor which oscillates the arm 11, the motor operating through the train of gearing above described extending to the gear box 51 (Fig. 2). Driving connection from the gears 50ª to the cam include a pinion 82 on a shaft 83, which has driving connection through beveled gears 84, 85, with the cam shaft 86 on which the cam 73 is mounted.

The cam operates through intermediate mechanism to swing the carrier frame 71 up and down. Such mechanism includes rock arms 87 and 88. The arm 87 is loose on the shaft 72 for independent rocking movement. The arm 88 is keyed to the shaft. The arm 87 carries the cam follower roll 89 running on the cam. The lower end of the rock arm 87 is bifurcated or formed with a yoke 90 which straddles a horizontal shaft 91, the latter providing an operating connection between the arms 87 and 88. The rock arm 88 is also formed with a bifurcated end or yoke 92 which straddles the shaft 91 (Fig. 6). A coil spring 94 mounted on the rod 91 is held under compression between collars 95 and 96. The collar 96 is screw threaded on the shaft 91. A knob 97 keyed to the shaft is rotatable for moving the stop collar 96 along the shaft for adjusting the compression of the spring 94. The yoke 90 and collar 95 are free for movement lengthwise of the shaft 91.

The cam 73 rotates continuously, thereby causing the cam lobe 98 to periodically rock the arm 87. This movement is imparted through the spring 94 and shaft 91 to the rock arm 88, thereby swinging the latter to the broken line position (Fig. 4) in which it is arrested by a stop 99 adjustable in a bracket 100. Any continued swinging movement of the arm 87 is then taken up by the compression spring 94. The spring serves to hold the follower roll 89 on the cam. The rocking of the arm 88 and shaft 72 causes upward swinging movement of the carrier 71. The rolls 70 therefore lift the workpiece or rod 45 into contact with the scoring disk 16, and at the same time place the rod under a flexure tending to sever the rod at the score line. Such lifting of the rod 45 also brings it into contact with the gauge plate 27 at a point which is close to the scoring disk and moves the plate upward against the compression force of the spring 36. During this movement the rolls 70 serve as an anvil or have an anvil action during the severing of the rod.

The severed rods are transferred to a sorting bin or other receptacle by means of endless belt conveyors 105 (Fig. 1). The forward end portion of the stock or tubing 45 is advanced to a position over the conveyors 105 before severance. The belt conveyors 105 are driven by the cam shaft 86 operating through an endless sprocket chain 106 trained over sprockets on the shaft 86 and a shaft 107. The shaft 86 also operates through a train of gears 108 to drive paddle wheels or arms 109. The forward end of the rod 45 is advanced into the path of the arms 109 which in cooperation with the rolls 70 insure the severance of the individual rods.

The paddles 109 strike downward on the free end of the advancing rod 45 and thereby apply a downward force before the score or cut produced by the blade 16 has passed beyond the rolls 70 and while the rod is still under strain or flexure produced by the upward pressure of the rolls.

The term "rod" as herein used applies to glass in the form of a tube as well as to solid rods or cane.

Modifications may be resorted to within the spirit and scope of my invention.

I claim:

1. Apparatus for severing lengths of glass rod from stock continuously drawn in the form of a rod and in the direction of its length, said apparatus comprising a scoring device mounted adjacent to the path of said stock and spaced laterally therefrom, automatic means for periodically applying a lateral force to the stock and thereby moving it laterally into contact with the scoring device and simultaneously placing a strain on the glass, said automatic means comprising a roll carrier, rolls journalled on the carrier in position to support and guide the stock, the rolls being on opposite sides of and in proximity to the scoring device, and means for moving the carrier and rolls in a direction to apply said lateral force to the stock.

2. The apparatus defined in claim 1, the scoring device comprising a disk with a scoring edge, and means for rotating the disk while in contact with the glass.

3. Apparatus for severing rods of hardened glass from stock which is continuously drawn from a molten supply body, shaped into a rod and hardened, the rod being drawn horizontally in the direction of its length, said apparatus comprising a scoring disk mounted for rotation about its axis, the disk being spaced a short distance from the path of the said stock, a carrier positioned opposite the scoring disk, rolls mounted on the carrier in position to engage and support the stock continuously, the rolls being positioned to engage the stock at opposite sides of the disk and on the opposite side of the stock from the scoring disk, and means for periodically moving said carrier in a direction to move the stock into contact with the scoring disk for scoring the stock and simultaneously placing the stock under a strain at the score line by the pressure of the rolls against the stock at opposite sides of the disk.

4. Apparatus for severing into individual rods, stock which is continuously formed into a rod and drawn horizontally in the direction of its length, said apparatus comprising a scoring disk, means for mounting the disk for rotation about an axis parallel with the path of said stock and with the disk directly over and spaced above the stock, a carrier providing a bottom support for the stock adjacent to the scoring disk, means for periodically moving the carrier upwardly and thereby lifting the stock into contact with the scoring disk, the said carrier comprising supporting and guiding rolls positioned to maintain continuous contact with the stock, the rolls being on opposite sides of the plane of the disk, and means cooperating with said rolls to apply a yielding downward pressure of the disk against the stock while the stock is held in said lifted position.

5. The apparatus defined in claim 4, including a rock shaft, said carrier being mounted on the rock shaft for rocking movement therewith, a cam, means for continuously rotating the cam, and means operated by the cam for rocking said shaft.

6. The apparatus defined in claim 4, and in combination therewith means for moving the scoring disk forward in the direction of movement of said stock and at substantially the same speed during the scoring operation.

7. Apparatus for severing glass rods from stock in the form of a rod which is continuously drawn horizontally in the direction of its length, said apparatus comprising a scoring disk mounted directly over the path of the stock in a plane perpendicular to the stock, means for rotating the disk about its axis, a rock shaft, a carrier keyed to the rock shaft, supporting and guiding rolls mounted on the carrier in position to engage and support the stock at points adjacent to and on opposite sides of the disk, a rock arm mounted for free rocking movement on the said rock shaft, a second rock arm fixed to said shaft, means providing a yielding connection between said rock arms, and means for rocking the first mentioned rock arm and thereby rocking the second rock arm and said carrier and lifting the rolls, thereby causing the said rolls to lift the stock into engagement with the scoring disk.

8. The apparatus defined in claim 7, and in combination therewith a stop in the path of said second arm limiting the swinging movement of the arm and the upward movement of the said rolls, the means for rocking the said rock arms comprising a cam and means for rotating the cam.

9. Apparatus for cutting into individual rods stock which is drawn continuously in the form of a rod advancing horizontally in the direction of its length, said apparatus comprising means for supporting and guiding the stock, a circular saw, a housing in which the saw is journalled for rotation about its axis, said housing being mounted over the path of said stock, a gauge positioned over said path, a supporting frame carrying said gauge, vertical guideways on the housing in which said frame is mounted for up-and-down movement, a vertically disposed shaft attached to said frame and mounted for up-and-down movement with the frame, an adjustable stop to limit the downward movement of the frame and said shaft, and means for limiting the upward movement of the gauge.

10. The apparatus defined in claim 9, the means for limiting the movement of said shaft comprising a screw-threaded sleeve in which the shaft is slidably mounted, a correspondingly threaded clamping element attached to said housing and through which the said sleeve is threaded and by which the said sleeve is clamped.

11. The apparatus defined in claim 10, and in combination therewith means for periodically lifting the stock into engagement with said saw.

12. Apparatus for severing a continuously drawn glass rod into lengths, comprising a circular saw, a housing in which the saw is journalled for rotation about its axis, a carrier frame on which said housing is mounted, a standard to which the frame is pivotally connected for up-and-down swinging movement for lifting and lowering said saw, an adjustable stop for limiting the downward movement of said carrier frame, means for periodically lifting the stock into contact with the saw, and a horizontal arm pivotally mounted for horizontal oscillation, the said standard and carrier frame for the saw being mounted on said arm in such position that the saw is periodically advanced with the drawn rod by the horizontal movement of the carrier frame about its pivot during the scoring operation of the saw, and means for rotating the saw.

13. The apparatus according to claim 12, and in combination therewith a motor mounted on said arm and forming the driving means for rotating the saw.

14. The apparatus defined in claim 1, including means for the moving the scoring device forwardly in the direction the stock is being drawn and at the same speed as the stock while in contact therewith.

15. The apparatus defined in claim 1, including a plate positioned between said rolls and extending parallel with and in close proximity to the stock, and means for yieldingly mounting the plate on the roll carrier for movement therewith into engagement with the stock.

16. Apparatus for severing glass rods from stock which is continuously drawn in the direction of its length, said apparatus including a scoring device mounted adjacent to the path of the stock, a rock shaft, a carrier keyed to the rock shaft, supporting and guiding rolls mounted on the carrier in position to engage and support the stock at points adjacent to and opposite sides of the scoring device, a rock arm mounted for free rocking movement on the said rock shaft, a second rock arm fixed to said shaft, means providing a yielding connection between the rock arms, and means for rocking the first mentioned rock arm and thereby rocking the second rock arm and said carrier and thereby moving the rolls into contact with the stock and causing the rolls to move the stock into engagement with the scoring device.

References Cited in the file of this patent

UNITED STATES PATENTS

| 1,220,201 | Danner | Mar. 27, 1917 |
| 1,585,896 | Danner | May 25, 1926 |
| 2,009,326 | Sanchez-Vello | July 23, 1935 |
| 2,155,131 | Hanlein | Apr. 18, 1939 |
| 2,290,837 | Stuckert | July 21, 1942 |
| 2,297,149 | Houck et al. | Sept. 29, 1942 |
| 2,332,013 | Rudert et al. | Oct. 19, 1943 |
| 2,447,962 | Schwalbe | Aug. 24, 1948 |
| 2,530,511 | Danner | Nov. 21, 1950 |
| 2,577,486 | Schwalbe | Dec. 4, 1951 |

FOREIGN PATENTS

| 197,333 | Great Britain | Sept. 1, 1924 |